United States Patent
LeClerg et al.

(10) Patent No.: US 7,099,794 B2
(45) Date of Patent: Aug. 29, 2006

(54) METHOD, APPARATUS, AND SYSTEM FOR MEMORY READ TRANSACTION BIASING IN MIRRORED MODE TO PROVIDE THERMAL MANAGEMENT

(75) Inventors: Frank E LeClerg, Portland, OR (US); Pete D Vogt, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/996,760

(22) Filed: Nov. 23, 2004

(65) Prior Publication Data

US 2006/0111866 A1     May 25, 2006

(51) Int. Cl.
*G01K 1/00* (2006.01)
(52) U.S. Cl. ............................ 702/130; 702/132
(58) Field of Classification Search .............. 702/130, 702/132, 136, 99; 324/754, 755, 756, 761, 324/762; 365/52, 63, 203, 211–212
See application file for complete search history.

(56) References Cited

U.S. PATENT DOCUMENTS 6,307,769 B1 * 10/2001 Nuxoll et al. ................. 365/63
6,373,768 B1 *  4/2002 Woo et al. ................... 365/211

* cited by examiner

*Primary Examiner*—Bryan Bui

(74) *Attorney, Agent, or Firm*—Michael J. Nesheiwat

(57) ABSTRACT

A thermal management that redirects the target of read transactions from a thermally failed Dual Inline Memory Module (DIMM) in one mirror, to the corresponding DIMM in the other mirror. The memory controller or MCH would effectively bias the read transactions toward the mirror that is best able to respond based on thermal feedback. Likewise, this may be used as a temporary redirection that continues for only as long as was required to reduce the operating temperature in the failing DIMM.

4 Claims, 2 Drawing Sheets

METHOD, APPARATUS, AND SYSTEM FOR MEMORY READ TRANSACTION BIASING IN MIRRORED MODE TO PROVIDE THERMAL MANAGEMENT

BACKGROUND

1. Field

This disclosure generally relates to thermal management via memory read biasing.

2. Background Information

The demand for more powerful computers and communication products has resulted in faster processors and memories that often have higher die temperatures and consume increasing amounts of power. However, design engineers struggle with reducing power consumption and die temperature.

One typical solution is a thermal throttle that throttles back the number of memory transactions that can be processed per a fixed period of time based on a current or projected temperature from a thermal sensor located on the memory chip. Consequently, the performance of the memory subsystem is decreased as a result of the decreased number of memory transactions.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

An area of current technological development relates to achieving maximum performance for communication products and computer or computing systems while effectively managing thermal control of computer systems. Typically, as the processor or memory or other system component operates at a higher performance, the operation of the transistors for the component may degrade and become slower even to the point of failure. The current state of the art includes utilization of thermo-mechanical solutions such as devices that are physically attached to the component that effect cooling. Other possibilities include the use of forced airflow or liquid cooling. These current methods, although effective are more costly than generally desired. As previously described, one current scheme for thermal management is a thermal throttle that throttles back the number of transactions that can be processed per a fixed period of time based on a current or projected temperature from a thermal sensor located on the component or components. This could include any of a number of types of components, not limited to processors, memory controllers, or dynamic memory modules. Consequently, the performance of the memory subsystem, for example, is decreased as a result of the decreased number of memory transactions.

Some memory subsystems support a mirrored mode of operation (also known commonly as RAID Level 1). For example, the memory subsystem is divided such that there is effectively a back-up copy of all unique data, so that if a memory read failure occurs to one copy of the data, the read transaction can still be completed successfully by redirecting the read to the back-up or mirrored copy.

In contrast, an apparatus, system, and/or method is conceived that redirects the target of read transactions from a thermally failed Dual Inline Memory Module (DIMM) in one mirror, to the corresponding DIMM in the other mirror. The memory controller or MCH would effectively bias the read transactions toward the mirror that is best able to respond based on thermal feedback. Furthermore, this may be used as a temporary redirection that continues for only as long as was required to reduce the operating temperature in the failing DIMM. In summary, the read transactions would be reduced on the failing DIMM, by temporarily returning the data from the non-failing mirrored DIMM side. In one embodiment, a thermally failed DIMM exceeds a predetermined temperature threshold as sensed by a thermal sensor.

Figure 1:
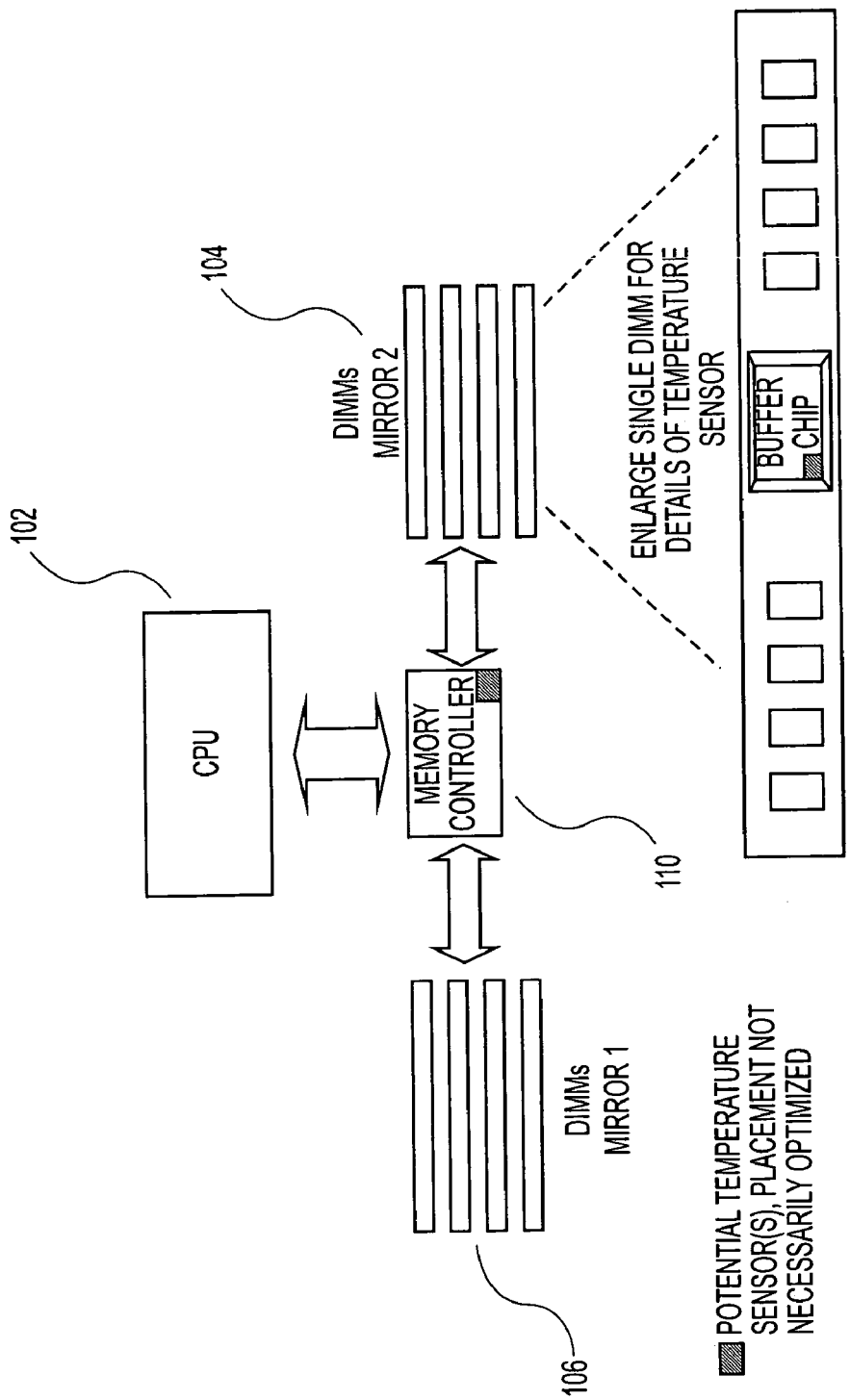
FIG. 1 is a system in accordance with an embodiment of the claimed subject matter.

FIG. 1 is a system in accordance with an embodiment of the claimed subject matter. In this system, a Central Processing Unit 102 sends write transactions to both groups of DIMMs 104 and 106 via a Memory Controller Hub (MCH) 110, thus providing the basis for having a spare copy available. The Central Processing Unit 102 also sends read transactions to either of the group of DIMMs, depending upon various factors such as overall memory throughput optimization or memory error recovery or other existing factors. In the event a temperature sensor on one of the DIMMs senses a temperature above a predetermined threshold, a thermal management technique is needed to reduce the temperature of the failing DIMM. In this situation, the MCH can redirect the target of read transactions from a thermally failed Dual Inline Memory Module (DIMM) in one mirror, to the corresponding DIMM in the other mirror. The memory controller hub biases the read transactions toward the mirror that is best able to respond based on thermal feedback.

Subsequently, the sensed temperature of the failing DIMM will decrease below the predetermined threshold and the memory read biasing may be disabled.

Figure 2:
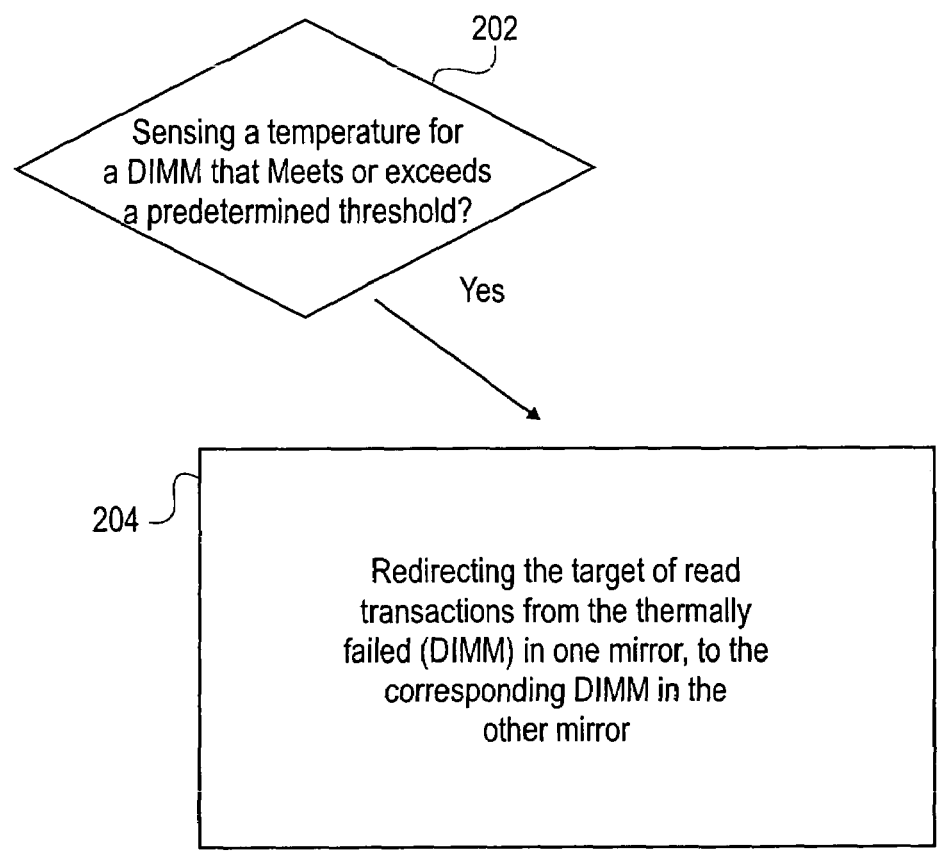
FIG. 2 is a flowchart illustrating an embodiment of a method in accordance with an embodiment of the claimed subject matter.

FIG. 2 is a flowchart illustrating an embodiment of a method in accordance with the claimed subject matter. This particular flowchart comprises a plurality of diamonds and blocks 202 and 204, although, of course, the claimed subject matter is not limited to the embodiment shown. For this embodiment, the flowchart depicts, a memory read biasing thermal management. If a temperature sensor senses a temperature that exceeds or meets a predetermined threshold for a DIMM, as illustrated by a diamond 202, the flowchart proceeds to block 204. In block 204, a memory controller or MCH redirects the target of read transactions from the thermally failed (DIMM) in one mirror, to the corresponding DIMM in the other mirror Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for thermal management of a memory subsystem of at least a first and second DIMM comprising
sensing a temperature for a first DIMM that meets or exceeds a predetermined threshold; and
redirecting a read transaction from the first DIMM in one mirror, to the corresponding second DIMM in the other mirror, if the sensed temperature of the first DIMM has met or exceeded the predetermined threshold,
disabling the redirection of the read transaction from the first DIMM when the sensed temperature of the first DIMM decreases below the predetermined threshold.

2. A memory controller hub (MCH) comprising:
the MCH to receive write and read transactions from a CPU; and
the MCH to redirect a read transaction from a first DIMM in one mirror that has a sensed temperature that meets or exceeds a predetermined threshold, to a corresponding second DIMM in the other mirror; and the MCH disabling the redirection of the read transaction from the first DIMM when the sensed temperature of the first DIMM decreases below the predetermined threshold.

3. A memory controller comprising:
the memory controller to receive write and read transactions from a CPU; and
the memory controller to redirect a read transaction from a first DIMM in one mirror that has a sensed temperature that meets or exceeds a predetermined threshold, to a corresponding second DIMM in the other mirror; and
the memory controller disabling the redirection of the read transaction from the first DIMM when the sensed temperature of the first DIMM decreases below the predetermined threshold.

4. A system comprising:
a CPU to generate read and write transactions;
a logic to receive write and read transactions from the CPU; and
the logic to redirect a read transaction from a first DIMM in one mirror that has a sensed temperature that meets or exceeds a predetermined threshold, to a corresponding second DIMM in the other mirror; and
the logic disabling the redirection of the read transaction from the first DIMM when the sensed temperature of the first DIMM decreases below the predetermined threshold.

* * * * *